(12) United States Patent
Pandey et al.

(10) Patent No.: US 11,949,570 B2
(45) Date of Patent: Apr. 2, 2024

(54) METHODS, SYSTEMS, AND COMPUTER READABLE MEDIA FOR UTILIZING MACHINE LEARNING TO AUTOMATICALLY CONFIGURE FILTERS AT A NETWORK PACKET BROKER

(71) Applicant: Keysight Technologies, Inc., Santa Rosa, CA (US)

(72) Inventors: Shardendu Pandey, Cedar Park, TX (US); Stefan Jan Johansson, Round Rock, TX (US); Jeffrey L. Pochop, Jr., Austin, TX (US); Jonathan Lee Harrod, Austin, TX (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 161 days.

(21) Appl. No.: 17/390,860

(22) Filed: Jul. 30, 2021

(65) Prior Publication Data
US 2023/0031654 A1 Feb. 2, 2023

(51) Int. Cl.
*H04L 43/04* (2022.01)
*G06N 20/00* (2019.01)
*H04L 43/028* (2022.01)
*H04L 67/562* (2022.01)

(52) U.S. Cl.
CPC .......... *H04L 43/028* (2013.01); *G06N 20/00* (2019.01); *H04L 67/562* (2022.05)

(58) Field of Classification Search
CPC . H04L 41/06; H04L 41/0604; H04L 41/0631; H04L 41/142; H04L 41/147; H04L 41/16; H04L 43/026; H04L 43/028; H04L 43/04; H04L 43/062; H04L 43/12; H04L 43/16; H04L 63/0236;
(Continued)

(56) References Cited

U.S. PATENT DOCUMENTS

| 7,385,924 B1 | 6/2008 | Riddle |
| 7,664,048 B1 | 2/2010 | Yung et al. |
| 8,503,307 B2 | 8/2013 | Tourrilhes et al. |

(Continued)

OTHER PUBLICATIONS

Balakrishnan et al, A Study of the Classification Capabilities of Neural Networks Using Unsupervised Learning: A Comparison With K-Means Clustering, The Psychometric Society, 17 pages, Dec. 1994.*

(Continued)

*Primary Examiner* — Frank Duong

(57) ABSTRACT

A method for network flow metadata processing at a network packet broker is described herein. The method includes, receiving, as input at a network packet broker, network traffic flow data, aggregating the network traffic flow data over a predefined time period to generate Internet protocol (IP) flow feature vectors containing metadata parameters associated with one or more particular endpoint devices, and providing the IP flow feature vectors to a machine learning element in the network packet broker. The method further includes identifying, by the machine learning element, anomalies existing in the metadata parameters included in the IP flow feature vectors, and automatically configuring one or more filter elements in the network packet broker in response to detecting the identified anomalies of the IP flow feature vectors.

20 Claims, 4 Drawing Sheets

(58) Field of Classification Search
CPC .......... H04L 63/0281; H04L 67/56206; G06N 3/044; G06N 3/0442; G06N 3/0455; G06N 5/01
See application file for complete search history.

(56) References Cited

U.S. PATENT DOCUMENTS

| | | | |
|---|---|---|---|
| 8,943,587 B2 | 1/2015 | Cooley | |
| 9,094,444 B2* | 7/2015 | Baltatu | H04L 43/00 |
| 9,386,103 B2 | 7/2016 | Clifton et al. | |
| 9,609,009 B2 | 3/2017 | Muddu et al. | |
| 10,009,364 B2 | 6/2018 | Dasgupta et al. | |
| 10,205,641 B2 | 2/2019 | McGrew et al. | |
| 10,404,732 B2* | 9/2019 | Munro | G06F 21/552 |
| 10,432,528 B2 | 10/2019 | Cortes Gomez | |
| 10,459,827 B1 | 10/2019 | Aghdaie et al. | |
| 10,574,512 B1* | 2/2020 | Mermoud | H04L 41/5009 |
| 10,716,017 B2* | 7/2020 | Lyon | H04L 41/0823 |
| 10,887,786 B2* | 1/2021 | Vedam | H04W 40/18 |
| 11,190,417 B2* | 11/2021 | Raney | H04L 43/0888 |
| 11,265,337 B2 | 3/2022 | Smelov et al. | |
| 11,394,640 B2 | 7/2022 | Ramaswamy et al. | |
| 11,418,420 B2 | 8/2022 | Sivaraman et al. | |
| 11,431,829 B2 | 8/2022 | Vann et al. | |
| 11,507,488 B2 | 11/2022 | Orzell et al. | |
| 11,575,560 B2 | 2/2023 | Ramachandran et al. | |
| 2010/0153316 A1* | 6/2010 | Duffield | H04L 41/00 706/47 |
| 2015/0113133 A1* | 4/2015 | Srinivas | H04L 43/20 709/224 |
| 2015/0256431 A1 | 9/2015 | Buchanan et al. | |
| 2017/0339022 A1* | 11/2017 | Hegde | H04L 41/06 |
| 2019/0222591 A1* | 7/2019 | Kislitsin | H04L 63/1416 |
| 2020/0106795 A1* | 4/2020 | Servajean | G06N 3/045 |
| 2020/0314128 A1* | 10/2020 | Hild | H04L 63/1416 |
| 2020/0364561 A1 | 11/2020 | Ananthanarayanan et al. | |
| 2022/0239720 A1 | 7/2022 | Madanapalli et al. | |
| 2023/0300045 A1 | 9/2023 | Harrod et al. | |

OTHER PUBLICATIONS

Shabtai, et al., "F-Sign: Automatic, Function-Based Signature Generation for Malware" in IEEE Transactions on Systems, Man, and Cybernetics, Part C (Applications and Reviews), vol. 41, No. 4, pp. 494-508, Jul. 2011, doi: 10.1109/TSMCC.2010.2068544.

Non-Final Office Action for U.S. Appl. No. 17/695,759 (dated Mar. 30, 2023).

Kekely et al. "Software Defined Monitoring of Application Protocols," IEEE Transactions on Computers, vol. 65, No. 2, pp. 615-626 (Feb. 2016).

Commonly-Assgined, co-pending U.S. Appl. No. 17/695,759 "Methods, Systems, and Computer Readable Media for Selectively Processing a Packet Flow Using a Flow Inspection Engine" (Unpublished, filed Mar. 15, 2022).

Bartolec, et al. "Impact of User Playback Interactions on In-Network Estimation of Video Streaming Performance", IEEE Transaction on Network and Service Management, vol. 19, No. 3, pp. 3547-3561 (2022).

Orsolic and Skorin-Kapov, "A Framework for In-Network QoE Monitoring of Encrypted Video Streaming", IEEE Access, vol. 8, pp. 74691-74706 (2020).

Commonly-Assigned, co-pending U.S. Appl. No. 18/109,826 for "Methods, Systems, and Computer Readable Media for Detecting Network Service Anomalies" (Unpublished, filed Feb. 14, 2023).

Nguyen et al., "GEE: A Gradient-based Explainable Variational Autoencoder for Network Anomaly Detection," arXiv:1903.06661v1, pp. 1-10 (Mar. 15, 2019).

Sanjuas, "Application of Machine Learning to Flow-based Network Monitoring," Polygraph.io, pp. 1-13 (2016).

Saboori et al., "Automatic firewall rules generator for anomaly detection systems with Apriori algorithm," 2010 3rd International Conference on Advanced Computer Theory and Engineering (ICACTE), pp. 1-4 (2010).

Pranschke et al., "Automated Firewall Rule Set Generation Through Passive Traffic Inspection," Conference: Information Security South Africa Conference, pp. 1-10 (Jan. 2009).

Mahoney et al., "PHAD: Packet Header Anomaly Detection for Identifying Hostile Network Traffic," Florida Institute of Technology Technical Report CS-2001-04, pp. 1-17 (2001).

Final Office Action for U.S. Appl. No. 17/695,759 (dated Oct. 12, 2023).

* cited by examiner

METHODS, SYSTEMS, AND COMPUTER READABLE MEDIA FOR UTILIZING MACHINE LEARNING TO AUTOMATICALLY CONFIGURE FILTERS AT A NETWORK PACKET BROKER

TECHNICAL FIELD

The subject matter described herein relates to processing network traffic flow data and machine learning. More particularly, the subject matter described herein relates to utilizing machine learning to automatically configure filters at a network packet broker.

BACKGROUND

Network packet brokers are used to perform a number of packet processing tasks, including aggregating packets from multiple sources, deduplicating packets (e.g., since the same packet may be captured in different places), filtering packets, redirecting packets to final destination, and/or replicating the packets to multiple destinations. Likewise, network packet brokers may also process other types of network traffic data generated by network devices, such as packet flows and/or network flow metadata, such as NetFlow. Notably, NetFlow is a statistical, flow-by-flow summary of packet data at a higher level than raw packet data. If two network hosts communicate with each other, instead of generating a copy of every packet, NetFlow provides statistics about the overall communication session. NetFlow is a collection of conversations and reporting statistics about each conversation.

Upon receiving the packet data or NetFlow data, a network operator can manually configure a network packet broker to utilize the received data to identify and possibly remedy anomalous network traffic conditions. For example, a network packet broker can be configured to address problematic behavior using the information contained within the packet header data or NetFlow data. In some instances, the network operator may be tasked to analyze the received packet data and create/modify filters provisioned on the network packet broker. As such, this network traffic analysis and filter tuning processes can be extremely labor intensive and time consuming.

In light of these and other difficulties, there exists a need for methods, systems, and computer readable media for utilizing machine learning to automatically configure filters at a network packet broker.

SUMMARY

A method for utilizing machine learning to automatically configure filters at a network packet broker is described herein. In one embodiment, the method comprises receiving, as input at the network packet broker, network traffic flow data, aggregating the network traffic flow data over a predefined time period to generate Internet protocol (IP) flow feature vectors containing metadata parameters associated with one or more particular endpoint devices, and providing the IP flow feature vectors to a machine learning element in the network packet broker. The method further includes identifying, by the machine learning element, anomalies existing in the metadata parameters included in the IP flow feature vectors, and automatically configuring one or more filter elements in the network packet broker in response to detecting the identified anomalies of the IP flow feature vectors.

According to another aspect of the subject matter described herein, the machine learning element includes an inferencing element that is configured to generate an anomaly score for each identified anomaly.

According to another aspect of the subject matter described herein, the network traffic flow data comprises network flow record data or ingress packet data.

According to another aspect of the subject matter described herein, configuring the one or more filter elements includes creating or modifying the one or more filter elements without user intervention.

According to another aspect of the subject matter described herein, the network packet broker includes a learning filter that is configured to add or suppress data provided to a machine learning training system associated with the machine learning element.

According to another aspect of the subject matter described herein, the machine learning training system includes at least one of an autoencoder, a decision tree, or a K-means clustering filter.

According to another aspect of the subject matter described herein, the machine learning training system conducts unsupervised learning to designate the anomalies.

The disclosed subject matter further includes a system for utilizing machine learning to automatically configure filters at a network packet broker. In one embodiment, the system comprises a network packet broker including at least one processor and a memory. The system further includes a network packet broker filter configuration engine implemented by the at least one processor for receiving, as input at the network packet broker, network traffic flow data, aggregating the network traffic flow data over a predefined time period to generate IP flow feature vectors containing metadata parameters associated with one or more particular endpoint devices, providing the IP flow feature vectors to a machine learning element in the network packet broker, identifying anomalies existing in the metadata parameters included in the IP flow feature vectors, and automatically configuring one or more filter elements in the network packet broker in response to detecting the identified anomalies of the IP flow feature vectors.

According to another aspect of the subject matter described herein, the machine learning element includes an inferencing element that is configured to generate an anomaly score for each identified anomaly.

According to another aspect of the subject matter described herein, the network traffic flow data comprises network flow record data or ingress packet data.

According to another aspect of the subject matter described herein, configuring the one or more filter elements includes creating or modifying the one or more filter elements without user intervention.

According to another aspect of the subject matter described herein, the network packet broker includes a learning filter that is configured to add or suppress data provided to a machine learning training system associated with the machine learning element.

According to another aspect of the subject matter described herein, the machine learning training system includes at least one of an autoencoder, a decision tree, or a K-means clustering filter.

According to another aspect of the subject matter described herein, the machine learning training system conducts unsupervised learning to designate the anomalies According to another aspect of the subject matter described herein, a non-transitory computer readable medium having stored thereon executable instructions that when executed by a processor of a computer control the computer to perform steps is provided. The steps include receiving, as input at the network packet broker, network traffic flow data, aggregating the network traffic flow data over a predefined time period to generate IP flow feature vectors containing metadata parameters associated with one or more particular endpoint devices, and providing the IP flow feature vectors to a machine learning element in the network packet broker. The steps further include identifying, by the machine learning element, anomalies existing in the metadata parameters included in the IP flow feature vectors, and automatically configuring one or more filter elements in the network packet broker in response to detecting the identified anomalies of the IP flow feature vectors.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

In some embodiments, the disclosed subject matter utilizes a network packet broker (NPB) that is provisioned with at least one automatic in-line filter, which is created and/or modified by utilizing machine learning elements. One such example includes an anomaly detection component that is configured to analyze network flow metadata (e.g., NetFlow records, mobile bearer data records, IMSIs, etc.) that can be used to identify and filter endpoint users that demonstrate anomalous behavior automatically and subsequently generate any appropriate alerts.

Figure 1:
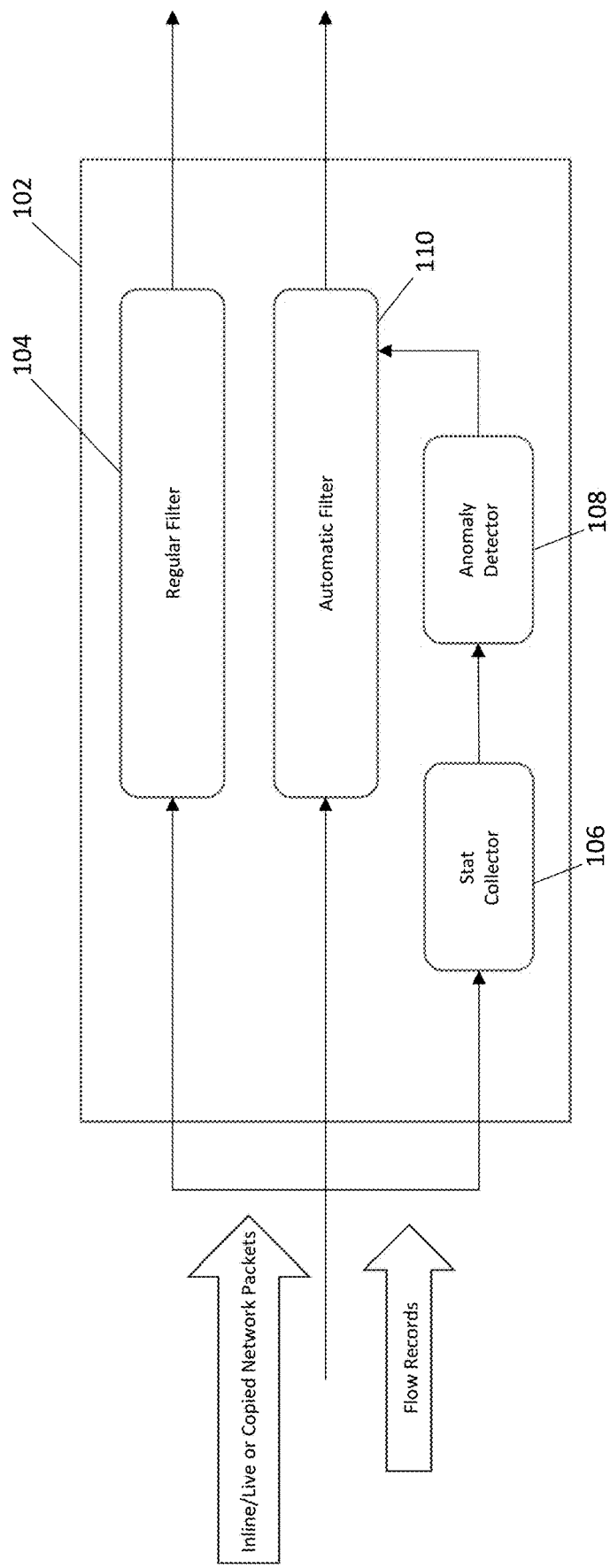
FIG. 1 is a block diagram illustrating an exemplary network packet broker configured with a statistics collector according to an embodiment described herein.

FIG. 1 illustrates a block diagram of a high-level network packet broker system associated with an exemplary automatic filtering component. As shown in FIG. 1, both network packet traffic and flow summary records (e.g., NetFlow records) are received by network packet broker 102 via communication ports. More specifically, network traffic flow data, which includes in-line or live network packets, copied network packets, flow records, and/or flow metadata records, is received on one or more ingress network ports of network packet broker 102. In some embodiments, the received network traffic flow data is directed to at least one of a regular filter 104, an automatic filter 110, and/or a statistics collector 106 provisioned on the network packet broker 102.

As shown in FIG. 1, statistics collector 106 is communicatively connected to an anomaly detector 108. In some embodiments, each of regular filter 104, automatic filter 110, statistics collector 106, and anomaly detector 108 may comprise a software component that is stored in memory and executed by a hardware processor of network packet broker 102. In some embodiments, regular filter 104 and/or automatic filter 110 can be configured to monitor for and/or filter Internet protocol (IP) addresses, port identifiers, packet type, or the like. Further, filters 104 and 110 can be implemented using field programmable gate array (FPGA) technology, network processor technology, simple hashing switch technology, or similar technologies.

In some embodiments, statistics collector 106 receives flow summary records (e.g., one or more of NetFlow, sFlow, IPFIX, IxFlow, etc. network flow metadata record format) or packets as input data. Statistics collector 106 is configured to conduct data processing on the NetFlow records or the packet data prior to being subjected to a machine learning training system associated with the anomaly detector in the network packet broker (as described in detail below and shown in FIG. 2). For example, statistics collector 106 may be adapted to aggregate the NetFlow records for a particular endpoint user/machine/device over a predefined period of time in order to create a new flow record (e.g., a feature vector). More specifically, the new flow record may include information indicating traffic characteristics associated with a particular user/actor, endpoint, IP address for a designated time period (e.g., a minute, 5 minutes, etc.). After grouping the NetFlow data in this manner, statistics collector 106 can generate a different set of data based on the aggregation. For example, the new flow record (e.g., an IP flow feature vector) may indicate the average of different parameters existing in the NetFlow records for the endpoint device during that time period.

For example, a user machine or endpoint can be identified as communicating with a plurality of different servers in which the user is requesting website information hosted by a social media server, downloading files from a corporate file server, and the like. All of this information associated with the user endpoint can be combined or aggregated into a record (e.g., IP flow feature vector) that indicates the average speed, the average length of flow, and an indication of the different endpoints being communicated with. Notably, such traffic characteristics information is packaged as an aggregated IP flow record. More specifically, these traffic characteristics can be collected as aggregated IP flow parameters and formatted into feature vectors that can be processed by a machine learning algorithm executed by the anomaly detector.

As indicated above, statistics collector 106 is configured to receive and process network traffic flow data, such as flow summary information (e.g., NetFlow records) or network packet data. In some instances, the processing conducted by statistics collector 106 may include storing at least a portion or all of the received flow summary information and subsequently generating and/or deriving flow metric information (e.g., IP flow information) that is based on the received flow summary information. In some embodiments, the generated flow metric information comprises feature vector data.

In some embodiments, exemplary feature vector data may include record or object that includes an collection of flow metadata. For example, a feature vector may include information corresponding to a particular time period (e.g., a 5 minute time period) such as: number of bytes transacted, number of packets transacted, number of flows, average duration of flow, number of SYN message, number of ACK messages, number of times port 80 is accessed/used, number of times port 443 is accessed/used, total number of unique ports, total number of partner IP addresses. Further, a feature vector may be indexed against a specific IP address (or other identifier) as part of a network traffic flow data record (e.g., an IP flow record). For example, an exemplary network traffic flow data record pertaining to a particular IP address may be represented as:

IPFLOW[IP-address]=<feature vector>

When the above network traffic flow data record is provide as input into the system (e.g., a machine learning training system described in detail below), the IP address index portion/section (e.g., IPFLOW[IP-address] section) of the network traffic flow data record is removed, thereby leaving the remaining feature vector portion. In some embodiments, a machine learning training system may be configured to be trained or "learn" from the feature vector portion input. Further, an inferencing engine in the anomaly detector component (as described in detail below and shown in FIG. 2) may be similarly configured to receive one or more feature vectors as inputs. If the inferencing engine detects an anomaly, the anomaly detector component can be configured to detect/identify an IP address (e.g., associated with a bad actor/endpoint) that corresponds to particular feature vector that has been flagged as an anomaly.

As indicated above, the flow metric information (i.e., IP feature vector information) generated by statistics collector 106 is provided to anomaly detector 108. In particular, anomaly detector 108 can be configured to receive and process the flow metric information using a machine learning training system. In some embodiments, the flow metric information may be forwarded to a machine learning training system associated with anomaly detector 108 for an initial training session. In some embodiments, the machine learning training system may comprise an artificial intelligence (AI) component, including but not limited, to a neural network, decision trees, K-means, autoencoders, long-short term memory (LSTM) systems, and the like. Notably, anomaly detector 108 can inspect the flow metric information to identify an anomalous network event/condition. Afterwards, anomaly detector may be configured to automatically generate one or more packet filtering rules, which are provided to filter elements provisioned in the network packet broker and applied to ingress network traffic that is being monitored. In some embodiments, the automatic filtering rules are dynamically generated (or modified) based on processing performed by the anomaly detector (and/or the machine learning training system) without user intervention. Moreover, the automatically generated filtering rules can be applied in parallel with, in series with, or in place of the regular filtering rules utilized by network packet broker 102. The specific manner in which the filtering rules are generated and provisioned on the network packet broker is described below with respect to FIG. 2.

Figure 2:
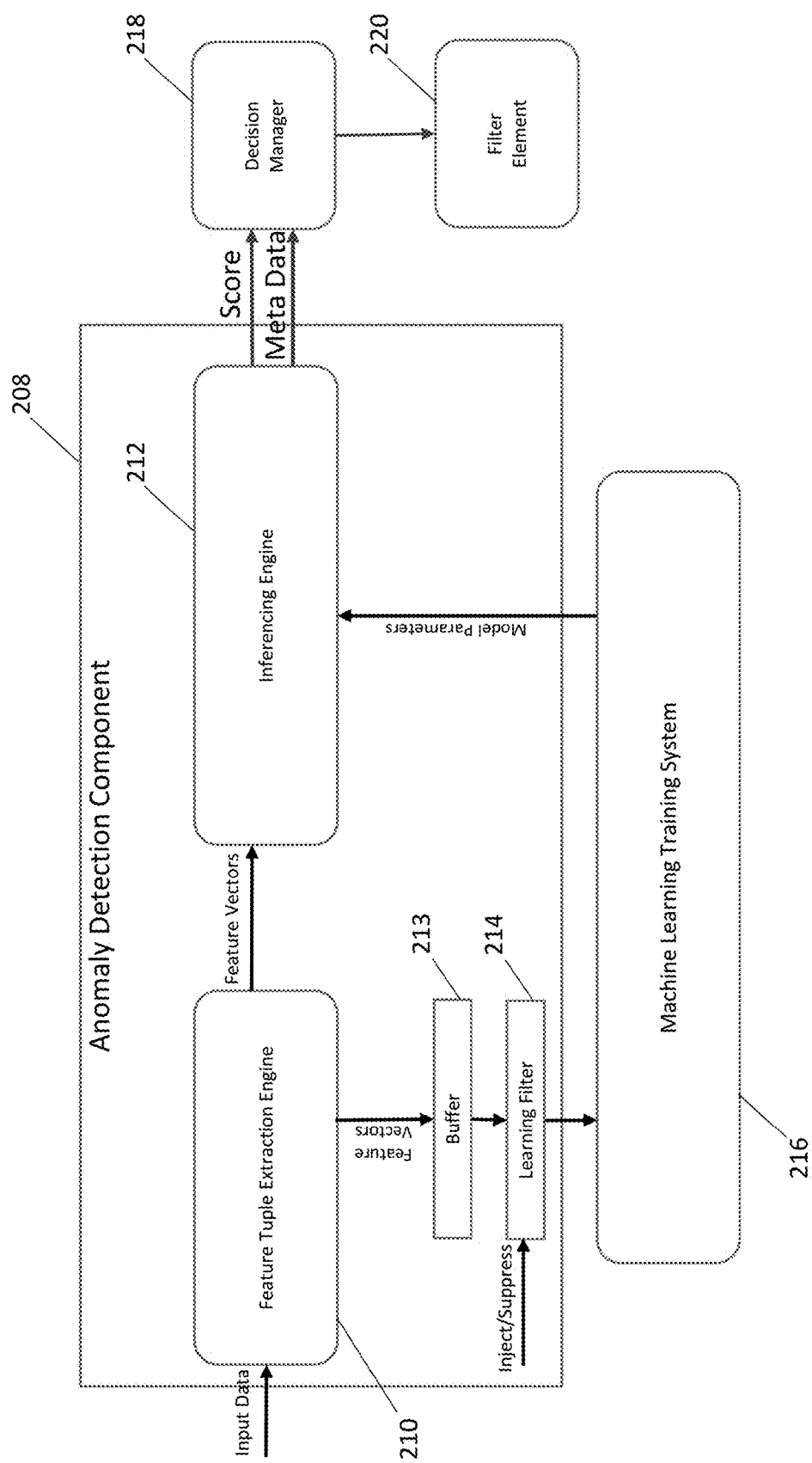
FIG. 2 is a block diagram illustrating an exemplary anomaly detection component of a network packet broker according to an embodiment described herein.

FIG. 2 is a block diagram illustrating an exemplary anomaly detection component of a network packet broker according to an embodiment described herein. As shown in FIG. 2, anomaly detection component 208 includes a feature tuple extraction engine 210 that is configured to extract flow metric information from the network traffic input (e.g., NetFlow data or network packet traffic) received by the network packet broker. In some embodiments, extraction engine 210 comprises a statistics collector (as described above and shown in FIG. 1) that is incorporated as a part of anomaly detection component 208. In particular, extraction engine 210 is configured to accumulate and aggregate network flow metadata associated with a particular endpoint user or endpoint device over a predefined period of time (e.g., minutes or hours). After aggregating the network flow metadata in this manner, extraction engine 210 is configured to generate feature vectors, which serves to group the flow metric information in a particular format that can be processed by a machine learning training system 216 and an inferencing engine 212. As mentioned above, the extracted feature vector data can include information such as number of bytes transacted, number of packets transacted, number of flows, average duration of flow, number of SYN messages, number of ACK messages, number of times port 80 is accessed/used, number of times port 443 is accessed/used, total number of unique ports, total number of partner IP addresses, and the like.

After conducting the feature vector extraction process, extraction engine 210 is configured to forward the extracted the feature vector data (and/or copies of the same) to a buffer component 213 and/or an inferencing engine 212. In some embodiments, buffer component 213 is configured to buffer statistics and parameters (e.g., tuple data) from the feature vector data for a predefined time segment (e.g., buffering an hour of statistics). After buffering the feature vector information, the resulting buffered data is directed to machine learning training system 216 via a learning filter 214.

In some embodiments, learning filter 214 can be configured to add or suppress the incoming feature vector data (e.g., from buffer component 213). Notably, learning filter 214 can be configured to censor (e.g., allow or deny) any unwanted learning. Further, learning filter 214 can also be used to inject or add any known anomaly patterns that may not be present in the original network traffic data stream for purposes of learning/training. The known anomaly patterns injected by learning filter 214 can originate from or be associated with data from a historical archive of known behavior (e.g., normal behavior and/or anomalous behavior).

In some embodiments, learning filter 214 can be used to address anomalous behavior that is detected at the device or link layer and to gather data exhibiting anomalous activity. Learning filter 214 may subsequently take action to address the problem if it is designated as real and/or significant (or prevent the detected problem as being flagged as anomalous in future detections). Further, learning filter 214 can be configured to re-enable the trigger or configure the input to only be suppressed for a fixed period of time. In some embodiments, the learning filter configuration is conducted via a manual process.

Alternatively, a hierarchy of machine learning models can be employed to monitor for "patterns of patterns" in such a manner that could enable a greater level of automation. For example, if a router is rebooting itself every month and network traffic is subsequently directed to circumvent and/or around the router, the increased network traffic on surrounding links can be flagged or identified as anomalous behavior. Learning filter 214 can be used to identify that the altered traffic patterns are not problematic unless the condition lasts more than an established threshold (e.g., an hour), but it could also be learned that there is a higher level pattern of anomaly detection. As such, it is advantageous to utilize the disclosed subject matter since network operators may have a general notion that some device reboots have occurred, but likewise fail to appreciate that the higher level pattern is indicative of a specific device failing once a month or at a particular time.

After being processed by learning filter 214, the feature vector data is directed to machine learning training system 216. In some embodiments, machine learning training system 216 may comprise a central processing unit, one or more field programmable gate arrays, and/or similar hardware components that are configured to execute a machine learning/artificial intelligence learning algorithm. For example, the algorithm can include a neural network, decision trees, K-means, autoencoders, long-short term memory (LSTM) systems, and the like. Specifically, machine learning training system 216 can be trained via execution of computer intensive processing of a multitude of feature vector information (e.g., IP flow records).

In some embodiments, machine learning training system 216 utilizes an autoencoder mechanism that is trained utilizing unsupervised learning. For example, feature vector information (which contains actor/user characteristics and network traffic characteristics) is provided as input into the machine learning training system 216. For example, this feature vector information may be provided for a number of hours and is subjected to extensive computer processing. As machine learning training system 216 is being trained, the model begins to determine and identify the various normal traffic patterns and the various normal actors. Likewise, machine learning training system 216 is subsequently able to detect if an anomaly occurs since the system is able to differentiate the anomalous event from the learned normal activity. In particular, machine learning training system 216 is configured to learn the natural behavior of the system as well as flagging any events that significant differ from that behavior.

In some embodiments, machine learning training system 216 can also support time based machine models. Notably, the machine learning training system can be configured to be trained for a given time period or some other slice of time, such as morning to noon. Once trained, machine learning training system 216 can be applied directly to an appropriate slot (i.e., to get direct inference) or be applied in any other time slot to conduct cross-inferencing. In some embodiments, multiple machines can be trained for various time periods or time slots.

Moreover, similar pattern datasets included in the feature vector information may be indicative of different activities when inspected at different time scales or time frames. For example, potentially anomalous instances that are not alarming when detected on an hourly basis may instead be concerning if the hour being monitor is late at night when another specific traffic pattern is normally expected. Similarly, a pattern that is generally not considered alarming in the afternoon during the work week may be alarming or designated as anomalous if the pattern occurs on a weekend day.

After machine learning training system 216 has been sufficiently trained with feature vector data, machine learning training system 216 is configured to generate model parameters that collectively represent a network machine model that can be implemented by inferencing engine 212. In some embodiments, inferencing engine 212 can be provisioned with a new network machine model (i.e., as represented by model parameters generated by machine learning training system 216) or, alternatively, have its currently provisioned network machine model updated with new model parameters. Once equipped with the appropriate model parameters, inferencing engine 212 may be configured to run on a constant basis in order to identify the presence of an anomaly in the processed network traffic data (e.g., feature vectors received directly from extraction engine 210). In some embodiments, inferencing engine 212 can be provided data offline in a batch, or alternatively, in real-time as data is received and collected.

After being provisioned with a machine model (e.g., model parameters), inferencing engine 212 can be configured to directly receive feature vector data (e.g., IP flow data) from extraction engine 210 (e.g., a statistics collector). In some embodiments, inferencing engine 212 utilizes the model parameters to process the feature vector data received from extraction engine 210. For example, inferencing engine 212 analyzes the feature vector data and attempts to identify anomalies or patterns as represented in the feature vector data. In response to finding an anomalous event or condition in the analyzed feature vector data, inferencing engine 212 is configured to assign a score to each feature vector (e.g., IP flow feature vector). For example, inferencing engine 212 is configured to assess anomalous conditions indicated by the feature vectors and assign a score that is representative of the degree and/or magnitude of the anomalous behavior of the assessed characteristics included in the feature vectors.

Once the scores are determined, inferencing engine 212 provides these assigned scores as scoring information to decision manager 218. Notably, inferencing engine 212 contemporaneously provides at least a portion of the underlying metadata (e.g., an IP address) of the feature vectors to decision manager 218 along with the corresponding scoring information. More specifically, after inferencing engine 212 identifies an anomaly, inferencing engine 212 forwards scoring information and the associated metadata to decision manager 218. For example, if inferencing engine 212 identifies feature vector data that is unexpected as compared to the norm (as defined by model parameters), inferencing engine 212 may generate a relatively high score that is indicative of the anomaly's departure from normal behavior. The metadata associated with the scoring information may include the IP address of an endpoint device that has been identified as problematic and associated with the detected anomaly. Once the scoring information and associated metadata is forwarded to decision manager 218, decision manager 218 is configured to utilize the received scoring information to determine the remedial action to be executed. In some embodiments, decision manager 218 may utilize the metadata and the scoring information to determine whether a simple network management protocol (SNMP) alert should be sent or whether the identified IP address in the metadata should be added to filter tables supported by the filters of the network packet broker. For example, inferencing engine 212 can be configured to generate and send a message alert (e.g., Kafka, SNMP, etc.) by providing the scoring information to an SNMP alert engine.

In addition, decision manager 218 may be configured to convert the scoring information and feature vector metadata received from inferencing engine 212 into a filter that can be utilized by filtering elements 220. More specifically, decision manager 218 is adapted to generate (or modify) one or more filters utilizing/processing the associated metadata input information that is associated with the scoring information. In some embodiments, decision manager 218 utilizes the scoring information as a trigger to generate the filtering rules. For example, if the scoring information exceeds a predefined threshold scoring value, decision manager 218 can be configured to automatically generate a filtering rule that specifies the identified anomalous IP address. For example, decision manager 218 can utilize the IP address included in the metadata as a specific address to monitor via a generated filtering rule that is configured in the filters of the network packet broker. Accordingly, the metadata and scoring information can be utilized by a decision manager 218 to formulate filtering rules for the filters provisioned on the network packet broker. After the filtering rules are formulated, the filtering rules can be forwarded by decision manager 218 to filter elements 220 for deployment/configuration. As such, ingress network traffic received on the network ports of the network packet broker can be monitored with the newly configured filters.

Figure 3:
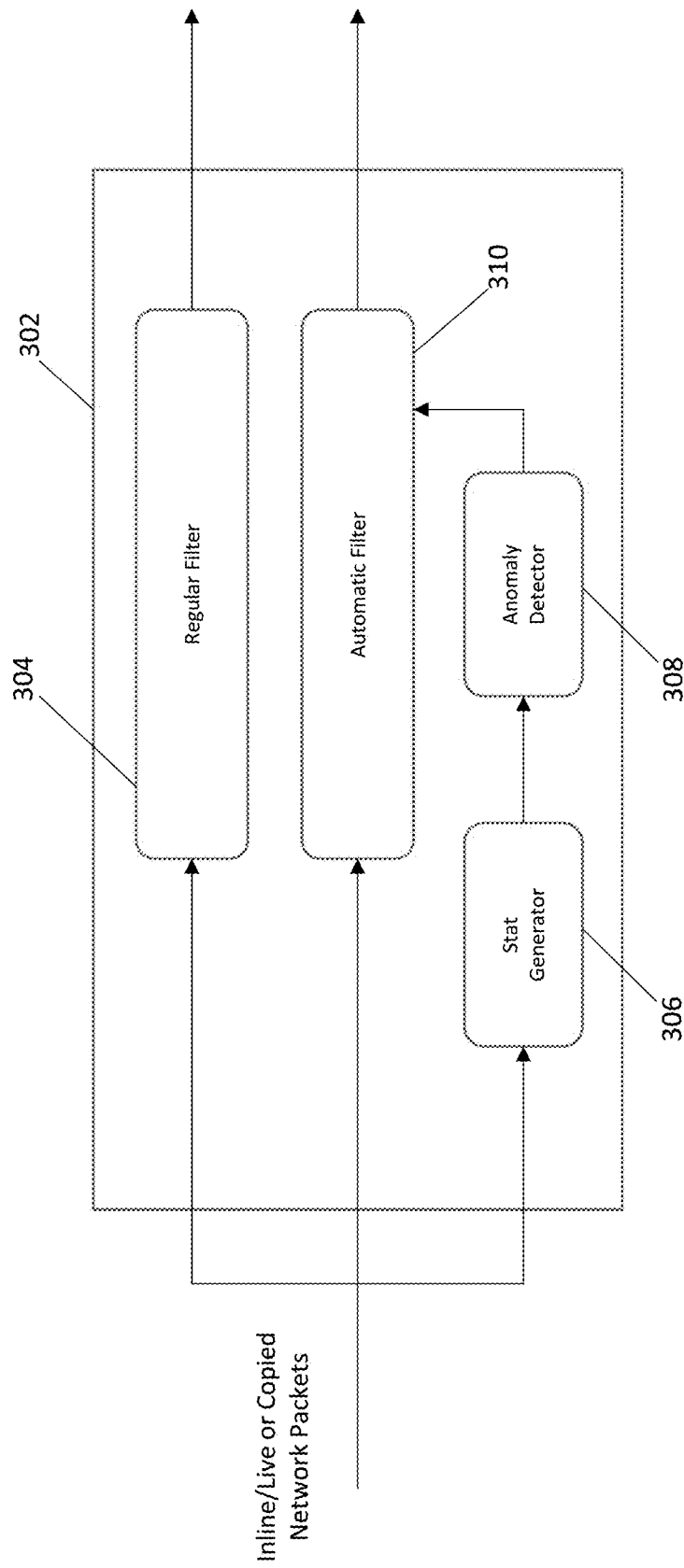
FIG. 3 is a block diagram illustrating an exemplary network packet broker configured with a statistics generator according to an embodiment described herein.

FIG. 3 is a block diagram illustrating an exemplary network packet broker configured with a statistics generator according to an embodiment described herein. As shown in FIG. 3, network packet broker 302 includes a regular filter 304, and automatic filter 110, and an anomaly detector 308, all of which are similarly provisioned on network packet broker 102 as described above with respect to FIG. 1. Notably, network packet broker 302 further includes a statistics generator 306 instead of a statistics collector (as shown in FIG. 1). In particular, statistics generator 306 is configured to receive network packet traffic for network packet broker 302. In the absence of flow summary information (e.g., NetFlow data), statistics generator 306 is configured to utilize the received network packet traffic to generate IP flow summary information (e.g., IP flow feature vector data or similar flow summary information/records). Statistics generator 306 is further configured to subsequently utilize this flow summary information as input for a machine learning training system and/or as input for a provisioned inferencing engine. The flow summary information (e.g., feature vectors) generated by statistics generator 306 is then forwarded to anomaly detector 308 for further processing. In particular, anomaly detector 308 may utilize the IP flow feature vector information to automatically generate new packet filtering rules (or modify existing packet filtering rules) in the manner described above (e.g., see description of FIG. 2 above).

Figure 4:
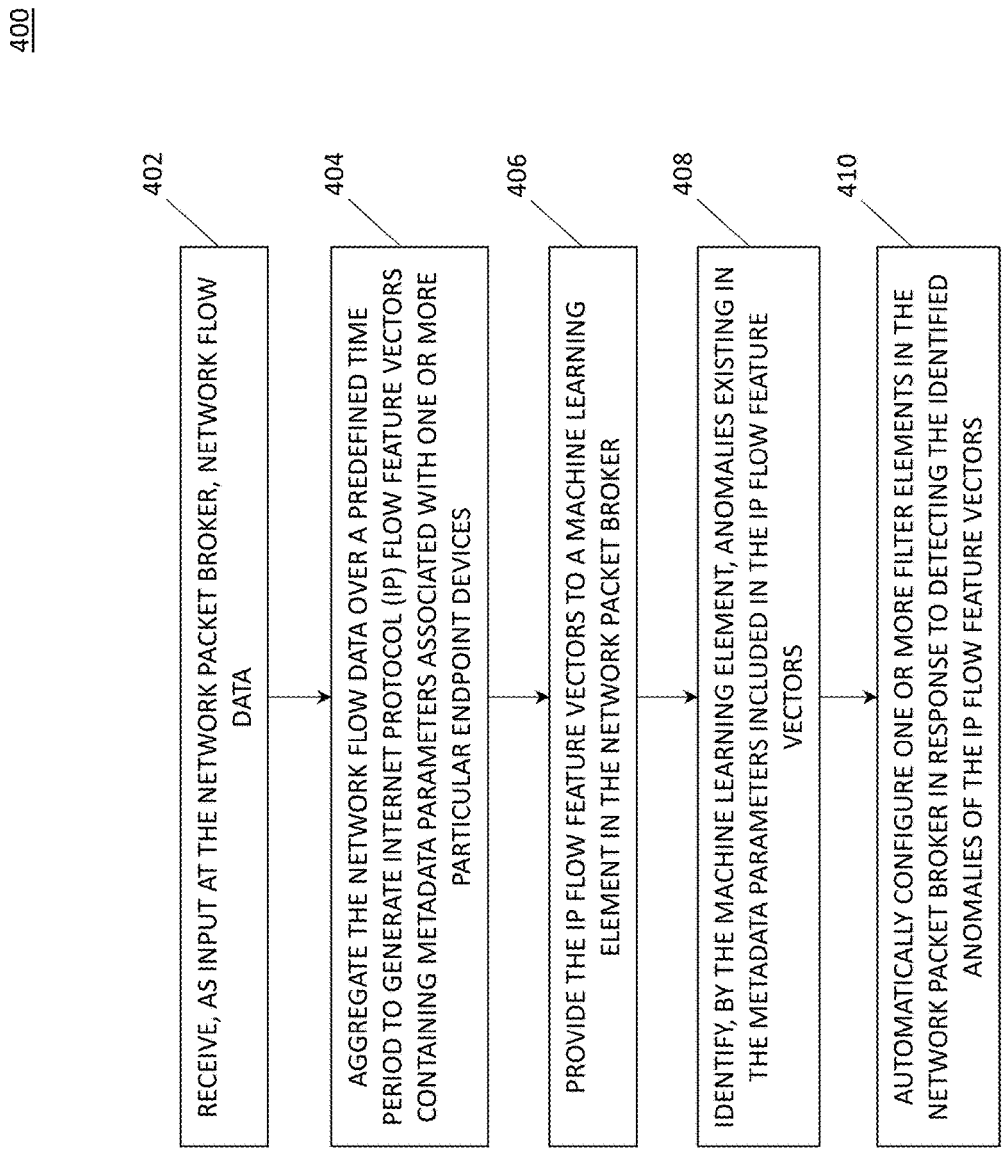
FIG. 4 is a flow chart illustrating an exemplary process for utilizing machine learning to automatically configure filters at a network packet broker according to an embodiment described herein.

FIG. 4 is a flow chart illustrating an exemplary process 400 for utilizing machine learning to automatically configure filters at a network packet broker. In some embodiments, process 400 may be a software algorithm or component that is stored in memory of a network packet broker and is executed by a hardware processor. Referring to FIG. 4, in step 402, process 400 includes receiving, as input at the network packet broker, network traffic flow data. For example, the network packet broker may include network ports that are configured to receive the network traffic flow data, which includes network traffic packets or flow summary data (e.g., NetFlow data).

In step 404, the process includes, aggregating the network traffic flow data over a predefined time period to generate IP flow feature vectors containing metadata parameters associated with one or more particular endpoint device. In some embodiments, a statistics collector element in the network packet broker is configured to receive the network traffic flow data over a period of time and generate IP flow feature vectors (e.g., feature vector data) that includes aggregated data pertaining to a particular user endpoint device over the aforementioned period of time.

In step 406, the process includes providing the IP flow feature vectors to a machine learning element in the network packet broker. In some embodiments, feature vector data is provided to an inferencing engine in a network packet broker for network traffic anomaly analysis. For example, the inferencing engine in the network packet broker has been provisioned with model parameters from a machine learning training system.

In step 408, the process includes, identifying, by the machine learning element, anomalies existing in the metadata parameters included in the IP flow feature vectors. In some embodiments, the inferencing engine uses the provisioned model parameters to analyze the parameters included in each of the feature vectors. Notably, the inferencing engine is configured by the model parameters to assign a score value to the analyzed feature vectors based on the anomalies indicated by the feature vector parameters. The inferencing engine then forwards the scoring information and the feature vector metadata to a decision manager that is configured to determine an appropriate remedial action (e.g., generate filter and/or issue an alert) based on the received score values.

In step 410, the process includes automatically configuring one or more filter elements in the network packet broker in response to detecting the identified anomalies of the IP flow feature vectors. In some embodiments, the decision manager determines that the received scoring information includes a score value that exceed a predefined threshold value, thereby triggering the creation of a new filter. The decision manager may then extract an IP address from the associated feature vector metadata and create an appropriate filter (e.g., add IP address to a filter table). Notably, the network packet broker may utilize the newly created filter to monitor for incoming packet traffic.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for utilizing machine learning to automatically configure filters at a network packet broker, the method comprising:
   receiving, as input at the network packet broker, network traffic flow data;
   aggregating, from the network traffic flow data, network traffic flow data associated with a particular endpoint device over a predefined time period to generate an Internet protocol (IP) flow feature vector containing metadata parameters associated with the particular endpoint device;
   providing the IP flow feature vector to a machine learning element in the network packet broker;
   identifying, by the machine learning element, one or more anomalies existing in the metadata parameters included in the IP flow feature vector; and
   automatically configuring one or more filter elements in the network packet broker in response to detecting the identified one or more anomalies of the IP flow feature vector.

2. The method of claim 1 wherein the machine learning element includes an inferencing element that is configured to generate an anomaly score for each identified anomaly.

3. The method of claim 1 wherein the network traffic flow data comprises network flow record data or ingress packet data.

4. The method of claim 1 wherein configuring one or more filter elements includes creating or modifying one or more filter elements in the network packet broker without user intervention.

5. The method of claim 1 wherein the network packet broker includes a learning filter that is configured to add or suppress data provided to a machine learning training system associated with the machine learning element.

6. The method of claim 5 wherein the machine learning training system includes at least one of an autoencoder, a decision tree, or a K-means clustering filter.

7. The method of claim 5 wherein the machine learning training system conducts unsupervised learning to designate the one or more anomalies.

8. A system for utilizing machine learning to automatically configure filters at a network packet broker, the system comprising:
 a network packet broker including at least one processor and a memory; and
 a network packet broker filter configuration engine implemented by the at least one processor for receiving, as input at the network packet broker, network traffic flow data, aggregating, from the network traffic flow data, network traffic flow data associated with a particular endpoint device over a predefined time period to generate an Internet protocol (IP) flow feature vector containing metadata parameters associated with the particular endpoint device, providing the IP flow feature vector to a machine learning element in the network packet broker, identifying one or more anomalies existing in the metadata parameters included in the IP flow feature vector, and automatically configuring one or more filter elements in the network packet broker in response to detecting the identified one or more anomalies of the IP flow feature vector.

9. The system of claim 8 wherein the machine learning element includes an inferencing element that is configured to generate an anomaly score for each identified anomaly.

10. The system of claim 8 wherein the network traffic flow data comprises network flow record data or ingress packet data.

11. The system of claim 8 wherein configuring the one or more filter elements includes creating or modifying the one or more filter elements without user intervention.

12. The system of claim 8 wherein the network packet broker includes a learning filter that is configured to add or suppress data provided to a machine learning training system associated with the machine learning element.

13. The system of claim 12 wherein the machine learning training system includes at least one of an autoencoder, a decision tree, or a K-means clustering filter.

14. The system of claim 12 wherein the machine learning training system conducts unsupervised learning to designate the one or more anomalies.

15. A non-transitory computer readable medium having stored thereon executable instructions that when executed by a processor of a computer control the computer to perform steps comprising:
 receiving, as input at a network packet broker, network traffic flow data;
 aggregating, from the network traffic flow data, network traffic flow data associated with a particular endpoint device over a predefined time period to generate Internet protocol (IP) flow feature vectors containing metadata parameters associated with one or more particular endpoint device;
 providing the IP flow feature vector to a machine learning element in the network packet broker;
 identifying, by the machine learning element, one or more anomalies existing in the metadata parameters included in the IP flow feature vector; and
 automatically configuring one or more filter elements in the network packet broker in response to detecting the identified one or more anomalies of the IP flow feature vector.

16. The non-transitory computer readable medium of claim 15 wherein the machine learning element includes an inferencing element that is configured to generate an anomaly score for each identified anomaly.

17. The non-transitory computer readable medium of claim 15 wherein the network traffic flow data comprises network flow record data or ingress packet data.

18. The non-transitory computer readable medium of claim 15 wherein configuring the one or more filter elements includes creating or modifying the one or more filter elements without user intervention.

19. The non-transitory computer readable medium of claim 15 wherein the network packet broker includes a learning filter that is configured to add or suppress data provided to a machine learning training system associated with the machine learning element.

20. The non-transitory computer readable medium of claim 19 wherein the machine learning training system includes at least one of an autoencoder, a decision tree, or a K-means clustering filter.

\* \* \* \* \*